United States Patent
Cook (10) Patent No.: US 11,273,990 B2
(45) Date of Patent: Mar. 15, 2022

(54) DRAPER BELT TENSIONING SYSTEM

(71) Applicant: CNH Industrial America LLC, New Holland, PA (US)

(72) Inventor: Joel T. Cook, Akron, PA (US)

(73) Assignee: CNH Industrial America LLC, New Holland, PA (US)

( * ) Notice: Subject to any disclaimer, the term of this patent is extended or adjusted under 35 U.S.C. 154(b) by 200 days.

(21) Appl. No.: 16/686,432

(22) Filed: Nov. 18, 2019

(65) Prior Publication Data

US 2021/0147152 A1  May 20, 2021

(51) Int. Cl.

| A01D 41/06 | (2006.01) |
| B65G 23/44 | (2006.01) |
| A01D 41/12 | (2006.01) |
| A01D 61/00 | (2006.01) |
| A01D 75/00 | (2006.01) |

(52) U.S. Cl.
CPC ............ *B65G 23/44* (2013.01); *A01D 41/06* (2013.01); *A01D 41/12* (2013.01); *A01D 61/002* (2013.01); *A01D 75/00* (2013.01); *B65G 2812/02168* (2013.01)

(58) Field of Classification Search
CPC .......... B65G 23/44; B65G 2812/02168; A01D 41/06; A01D 41/12; A01D 61/002; A01D 75/00; A01D 57/20; A01D 41/14
See application file for complete search history.

(56) References Cited

U.S. PATENT DOCUMENTS

| 2,631,421 | A | * | 3/1953 | Pierce | A01D 57/20 56/14.4 |
| 2,762,183 | A | * | 9/1956 | Linscheid | A01D 57/20 56/14.4 |
| 4,128,952 | A | * | 12/1978 | Duke | B65G 23/44 198/813 |

(Continued)

FOREIGN PATENT DOCUMENTS

| DE | 10361427 A1 | 8/2005 |
| EP | 2586287 A1 | 5/2013 |

(Continued)

OTHER PUBLICATIONS

Extended European Search Report for EP Application No. 20208222.8 dated Mar. 22, 2021 (six pages).

*Primary Examiner* — Arpad Fabian-Kovacs
(74) *Attorney, Agent, or Firm* — Peter Zacharias; Patrick Sheldrake (57) ABSTRACT

A draper belt tensioning system having a frame having a first tensioner mount, a roller, and a first belt tensioner. The roller is movable along a lateral direction that is perpendicular to a roller rotation axis. The first belt tensioner is connected to the first roller end and selectively connectable to the first tensioner mount. The first belt tensioner includes a first travel stop configured to selectively abut the first tensioner mount with the first tensioner mount between the first travel stop and the first roller end, a first spring, and a first threaded connector configured to move the first roller end closer to and further from the first travel stop upon rotation of the threaded connector. The first travel stop, first spring and first threaded connector are removable from the first tensioner mount without disassembly from each other and without disassembly from the first roller end.

17 Claims, 6 Drawing Sheets

(56) References Cited

U.S. PATENT DOCUMENTS

| | | | |
|---|---|---|---|
| 4,133,225 A * | 1/1979 | Love | A01D 41/142 475/19 |
| 4,362,005 A * | 12/1982 | Hanaway | A01D 41/14 198/814 |
| 4,369,617 A * | 1/1983 | Hanaway | A01D 61/008 198/814 |
| 4,438,617 A * | 3/1984 | Ulrich | B65G 23/44 198/626.5 |
| 5,030,173 A * | 7/1991 | Bryant | B65G 23/44 474/136 |
| 6,116,008 A * | 9/2000 | Digman | A01D 41/16 56/15.8 |
| 6,202,397 B1 * | 3/2001 | Watts | A01D 61/002 56/14.5 |
| 7,052,423 B2 * | 5/2006 | Jonckheere | A01D 41/142 474/148 |
| 8,544,250 B2 | 10/2013 | Lovett et al. | |
| 2005/0045452 A1 * | 3/2005 | Iseli | B65G 23/44 198/813 |
| 2006/0016165 A1 * | 1/2006 | Wernsmann | A01D 61/008 56/16.6 |
| 2013/0105282 A1 * | 5/2013 | Hoffman | A01D 57/20 198/814 |
| 2015/0366139 A1 * | 12/2015 | Rittershofer | B65G 23/44 460/114 |
| 2016/0360699 A1 | 12/2016 | Allochis | |
| 2017/0251606 A1 * | 9/2017 | Van Overschelde | A01D 41/16 |
| 2018/0332772 A1 * | 11/2018 | Fuechtling | A01D 34/04 |
| 2019/0380273 A1 * | 12/2019 | Mossman | A01D 57/20 |
| 2020/0000038 A1 * | 1/2020 | Coppinger | A01D 61/008 |
| 2020/0331704 A1 * | 10/2020 | Howard | B65G 21/06 |

FOREIGN PATENT DOCUMENTS

| | | |
|---|---|---|
| EP | 2586288 A1 | 5/2013 |
| EP | 3391726 A1 | 10/2018 |
| EP | 3391727 A1 | 10/2018 |
| WO | 2017058498 A1 | 4/2017 |

* cited by examiner

DRAPER BELT TENSIONING SYSTEM

BACKGROUND OF THE INVENTION

Agricultural equipment, such as combines, swathers and windrowers, typically include a header that is movably attached to the chassis of the vehicle. The header typically is located at the front of the vehicle, and extends laterally relative to the vehicle's forward direction of travel. In some cases, the header is a single rigid body. In other cases the header is a so-called multi-segment or articulated header comprising multiple sections that are movable relative to each other. For example, the header may have a center section located along the vehicle fore-aft centerline, and a wing section attached at, and extending laterally from, each lateral end of the center section. Devices such as hydraulic or pneumatic cylinders, mechanical linkages, and the like, may be provided to selectively control the heights of the center section and the wing sections.

A header typically includes conveyors to move crop materials from the lateral ends of the header towards the center of the header, and from the center of the header back towards the combine's threshing and separating system. In some cases, these conveyors comprise draper belts that are supported on rollers or the like. Draper belts typically require occasional replacement, as well as periodic maintenance to adjust tension and tracking. It is also sometimes necessary to remove crop material that become trapped between the inner surface of the belt and the support rollers. To facilitate such service, the a draper belt might be mounted on one or more movable belt tensioning rollers. For example, a tensioning roller might be located at one end of the belt, and be mounted such that it is movable towards and away from an opposite roller to increase and decrease tension. The tensioning roller is attached to the header frame by one or more compression or tension springs, which are deformed to generate tension in the belt. In some cases, the spring compression is adjusted by rotating mounting screws that hold the springs to the frame.

Such maintenance can be time-consuming, and relatively difficult to accomplish. For example, it might be necessary to move a tensioning roller mounted on M16 bolts up to two inches or more to remove the belt, thus requiring as many as 25 complete turns of each mounting bolt. Such procedure can become even more difficult when the belt maintenance is performed in the field to open the belts to remove accumulated crop materials.

Thus, the state of the art still requires development.

This description of the background is provided to assist with an understanding of the following explanations of exemplary embodiments, and is not an admission that any or all of this background information is necessarily prior art.

SUMMARY OF THE INVENTION

In one exemplary aspect, there is provided a draper belt tensioning system having a frame having a first tensioner mount, a roller extending along a roller rotation axis from a first roller end to a second roller end, and a first belt tensioner. The roller is movable relative to the frame along a lateral direction that is perpendicular to the roller rotation axis. The first belt tensioner is connected to the first roller end and selectively connectable to the first tensioner mount. The first belt tensioner includes a first travel stop configured to selectively abut the first tensioner mount with the first tensioner mount between the first travel stop and the first roller end, a first spring, and a first threaded connector configured to move the first roller end closer to and further from the first travel stop upon rotation of the threaded connector. The first travel stop, first spring and first threaded connector are removable from the first tensioner mount without disassembly from each other and without disassembly from the first roller end. The draper belt tensioning system also may include a second belt tensioner that is connected to the second roller end and selectively connectable to a second tensioner mount.

In some aspects, the first belt tensioner comprises a threaded hole connected to the first roller end, and the first threaded connector comprises a threaded rod that is rotationally engaged with the threaded hole.

In some aspects, the first belt tensioner comprises a threaded rod fixed to the first roller end, and the first threaded connector comprises a threaded nut rotationally engaged with the first threaded rod.

In some aspects, the first belt tensioner comprises: a shaft connecting the first roller end to a distal end stop; the first threaded connector comprises a threaded collar surrounding the shaft; an adjustment nut surrounds the shaft and the threaded collar and the threaded connector and adjustment nut have corresponding outer and inner threads, respectively; and the threaded collar, the adjustment nut and the spring are located between the first tensioner mount and the distal end stop.

In some aspects, the first travel stop comprises a face of a threaded nut.

In some aspects, the first travel stop comprises a face of the first spring.

In some aspects, the first travel stop comprises a face of a washer.

In some aspects, the first travel stop comprises a face of an adjustment nut or the first threaded connector.

In some aspects, the first tensioner mount comprises an engagement surface facing away from the first roller end and configured to contact the travel stop, and a slot that extends through the engagement surface and opens at a lateral edge of the engagement surface. The first belt tensioner is moveable between an engaged position in which a portion of the first belt tensioner extends through the slot and the first travel stop contacts the engagement surface, and a disengaged position in which the first belt tensioner is removed from the slot and the first travel stop does not contact the engagement surface.

In some aspects, the first tensioner mount comprises a passage extending in a direction away from the first roller end and having a fixed portion and a movable portion, the movable portion being movable between a closed position in which the passage is closed in a lateral direction that is perpendicular to the direction away from the first roller end, and an open position in which the passage is open in the lateral direction. An engagement surface faces away from the first roller end. The first belt tensioner is moveable between: an engaged position in which a portion of the first belt tensioner extends through the passage, the movable portion of the passage is in the closed position, and the first travel stop contacts the engagement surface, and a disengaged position in which the movable portion of the passage is in the open position, the first belt tensioner is removed from the passage, and the first travel stop does not contact the engagement surface.

In some aspects, the first tensioner mount comprises a passage extending in a direction away from the first roller end, and having a lateral size in a plane perpendicular to the direction away from the first roller end that is larger than a corresponding lateral size of the first travel stop, and one or more aperture plates selectively positionable between the passage and the first travel stop to prevent the first travel stop from entering the passage. The first belt tensioner is moveable between: an engaged position in which a portion of the first belt tensioner extends through the passage, and the one or more apertures are positioned to prevent the first travel stop from entering the passage, and a disengaged position in which the one or more apertures are positioned to allow the first travel stop to enter the passage.

In some aspects, the second belt tensioner comprises a second travel stop configured to selectively abut the second tensioner mount with the second tensioner mount between the second travel stop and the second roller end, a second spring, and a second threaded connector configured to move the second roller end closer to and further from the second travel stop upon rotation of the threaded connector. The second travel stop, second spring and second threaded connector are removable from the second tensioner mount without disassembly from each other and without disassembly from the second roller end. The first travel stop may be connected to the second travel stop by a crossbar. The first travel stop may have a first pin extending in a first lateral direction that is perpendicular to a direction away from the first roller end, and the second travel stop may have a second pin extending in a second lateral direction that is perpendicular to a direction away from the second roller end. The first tensioner mount may have a first engagement surface facing away from the roller and configured to receive the first pin, and a first slot adjacent the first engagement surface and extending towards the roller, and the second tensioner mount may have a second engagement surface facing away from the roller and configured to receive the second pin, and a second slot adjacent the second engagement surface and extending towards the roller.

In another exemplary aspect, there is provided a method for disconnecting a draper belt tensioning system. The method includes adjusting a first belt tensioner by rotating a first threaded connector to move a first end of a roller a first distance away from a first tensioner mount, moving the first belt tensioner to disengage the first belt tensioner from the first tensioner mount, and moving the first end of the roller a second distance away from the first tensioner mount, the second distance being greater than the first distance, without disassembling the first belt tensioner or removing the first belt tensioner from the first end of the roller.

In some aspects, the method also may include adjusting a second belt tensioner by rotating a second threaded connector to move a second end of the roller a respective first distance away from a second tensioner mount, moving the second belt tensioner to disengage the second belt tensioner from the second tensioner mount, and moving the second end of the roller a respective second distance away from the second tensioner mount, the respective second distance being greater than the respective first distance, without disassembling the second belt tensioner or removing the second belt tensioner from the second end of the roller.

In another exemplary aspect, there is provided an agricultural combine having a chassis configured for movement across a surface, a threshing and separating system mounted on the chassis, and a header attached to the chassis and operatively connected to the threshing and separating system by a feeder housing. The header may include the draper belt tensioning systems as described above in this section.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Exemplary embodiments of the present invention provide draper belt tensioning systems for use on headers for agricultural equipment, such as combines, swathers, windrowers, and the like. It will be appreciated that other embodiments may be used in other types of machines having a similar arrangement of parts, upon incorporation of the appropriate features of the inventions herein.

Figure 1:
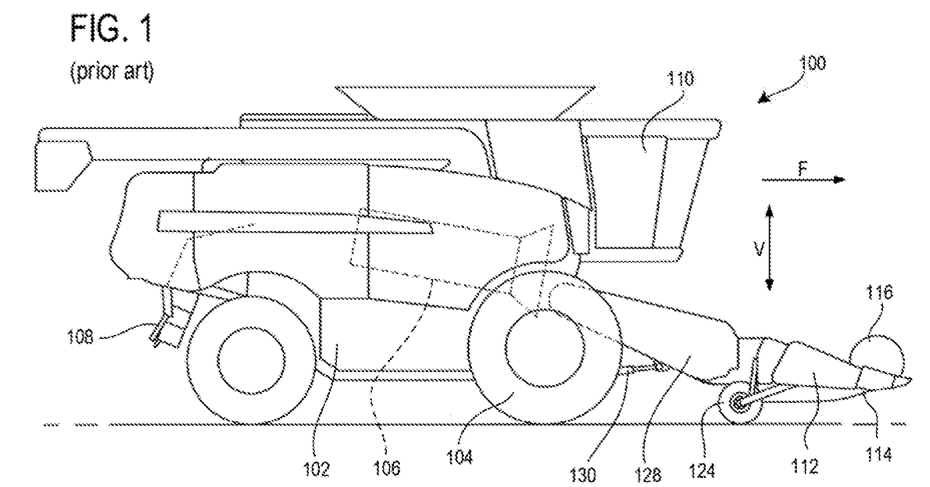
FIG. 1 is a side view of a prior art agricultural combine.

FIG. 1 illustrates an example of a prior art agricultural combine 100, with which embodiments of the invention may be used. The combine 100 includes a chassis 102 that is configured for driving on a surface (e.g., the ground or a road), such as by being supported by pneumatic wheels 104, tracked wheel assemblies, or the like. The combine 100 includes a threshing and separating system 106 mounted on or within the chassis 102. The threshing and separating system 106 may include mechanisms such as one or more threshers (e.g., an axial flow thresher), sieves, blowers, and the like, as well as an associated grain hopper and unloader. Threshing and separating systems 106 and their associated components are well-known in the art, and need not be described in detail herein. The combine 100 also may include other features, such as a spreader 108, operator cab 110, and the like.

Figure 2:
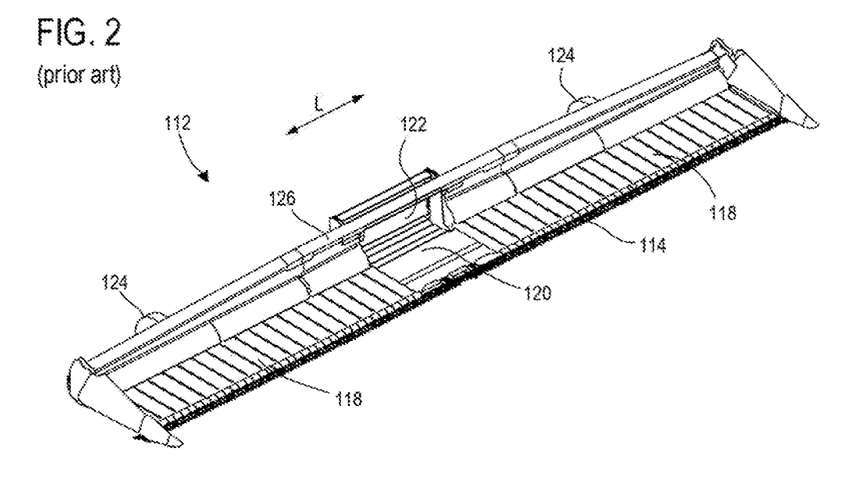
FIG. 2 is an isometric view of a prior art header.

Referring also to FIG. 2, the combine 100 also includes a header 112, which is configured to cut and harvest crop material from the ground as the combine 100 drives in the forward direction F. For example, the header 112 may include one or more cutter bars 114 located at or near the leading edge of the header 112 to cut crops at or near the ground level, and one or more reels 116 configured to pull the crop material backwards towards the header 112. The header 112 also includes crop conveyors 118 that are configured to move the crop material at the lateral ends of the header 112 towards the center of the header 112. The crop conveyors 118 may be in the form of draper belts, auger screws, or the like. At the center, the header 112 may include a feeder conveyor 120 that conveys the crop material backwards towards a crop outlet 122. The feeder conveyor 120 may comprise a draper belt, a feeder drum, one or more augers, or the like. The header 112 also may include gauge wheels 124 or skids to control the height of the header 112 over the ground.

The header 112 is built on a frame 126, which is attached to the chassis 102 by a feeder housing 128. The feeder housing 128 is configured to convey crop material backwards from the header 112 to the threshing and separating system 106. The feeder housing 128 may be movable by one or more feeder housing actuators 130 to raise and lower the header 112 in a vertical direction V relative to the ground.

The illustrated exemplary header 112 is a unitary header having a single frame that extends continuously between the ends of the header 112 in the lateral direction L. In other embodiments, the header 112 may comprise a multi-segment or articulated header having a center section and one of more wing sections movably attached to the lateral end of the center section by pivots or linkages. In either case, the header 112 has a central region defined by the lateral extent of the crop outlet, and lateral regions extending in the lateral direction L from the central region.

In use, the header 112 cuts crop materials with the cutter bar 118, receives the crop materials on the conveyors 118, 120, and conveys the crop materials back through the crop outlet 122 to the threshing and separating system 106. One or both of the conveyors 118, 120 may comprise a draper belt system having a segmented or continuous belt supported on rollers. At least two of the rollers are configured to apply some degree of tension to the belt, to ensure that the belt does not slip on the drive roller. Maintenance on the belt is performed by releasing the tension, such as by canceling the force of a biasing spring and/or moving the rollers towards each other. Mechanisms for releasing and reapplying belt tension are described in more detail in relation to the following exemplary embodiments.

Figure 3:
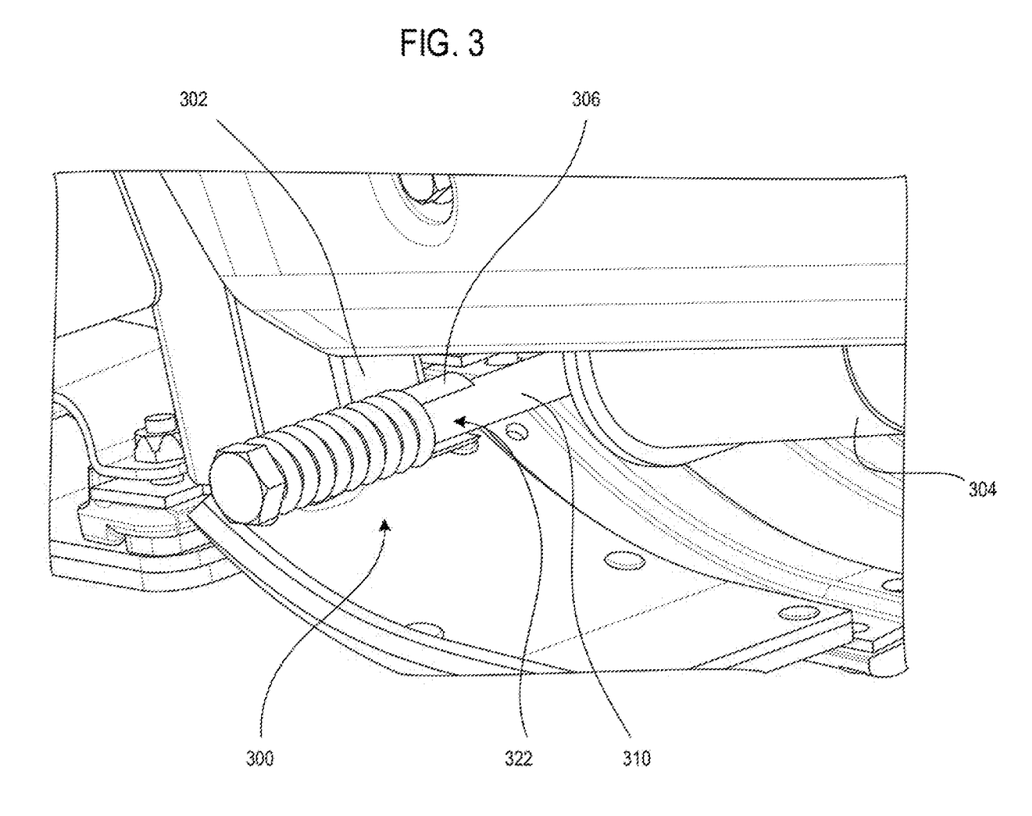
FIG. 3 shows a first exemplary embodiment of a draper belt tensioning system.
Figure 4A:
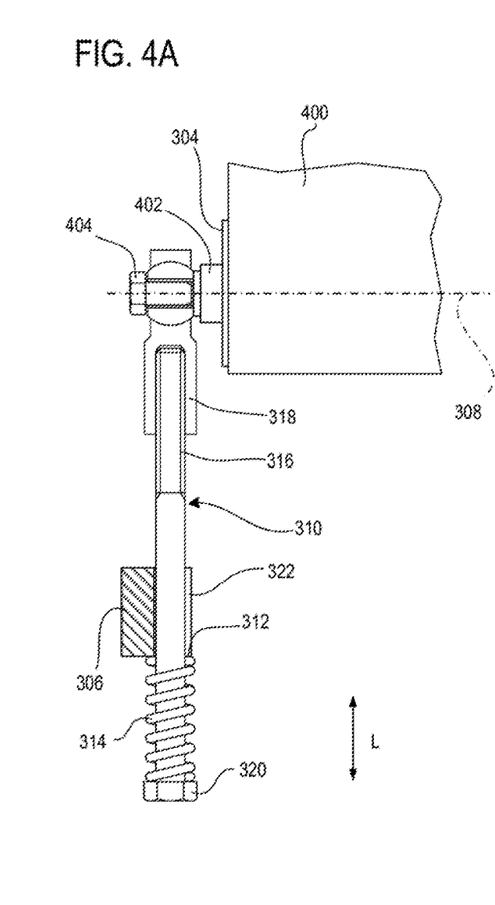
FIGS. 4A, 4B and 4C show the draper belt tensioning system of FIG. 3 in the tensioned, reduced tension and released positions, respectively.
Figure 4B:
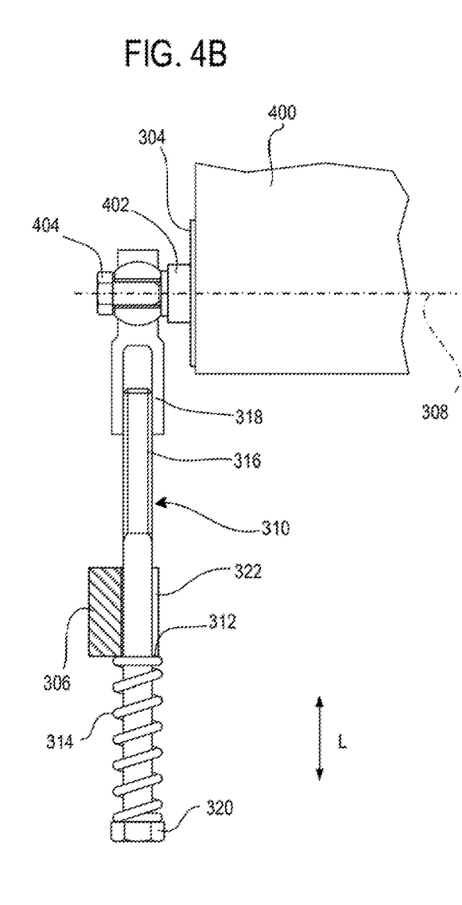
Figure 4C:
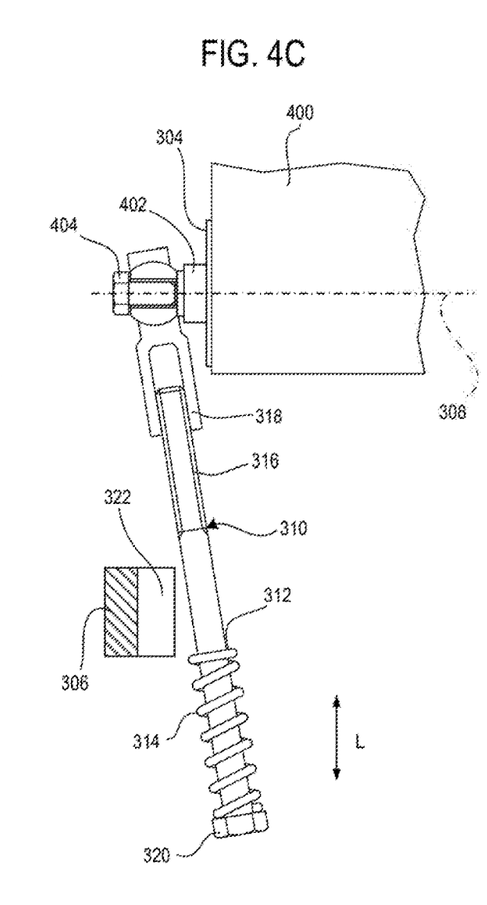

Referring to FIGS. 3-4C, a first exemplary embodiment of a draper belt tensioning system 300 is shown. The system 300 connects the header frame 302, and is configured to apply a tensile force to a roller 304 to hold the draper belt in tension. It will be appreciated that the header frame 302 may be any structural part of a unitary header or a multi-segment header. For example, the header frame 302 may be a component of a multi-segment header center section or wing section, or it may be the a component of a unitary header. The system includes a tensioner mount 306 that is attached to the frame 302, a roller 304 that extends along a roller axis 308 from one end of the roller to the other end of the roller, and a belt tensioner 310 that is connected to a first end of the roller 304 and is selectively connectable to the tensioner mount 306. The roller 304 is mounted on an axle, bearings or the like to allow the roller to rotate about the roller rotation axis 308, as known in the art. A draper belt 400 is wrapped around the roller 304. The roller 304 is movable in a lateral direction L that is perpendicular to the roller rotation axis 308, to release or apply tension to the belt 400.

The belt tensioner 310 generally includes a travel stop 312, a spring 314 and a threaded connector 316. When the belt tensioner 310 is attached to the tensioner mount 306, the travel stop 312 abuts the tensioner mount 306, with the tensioner mount 306 located between the travel stop 312 and the end of the roller 304. The threaded connector 316 is configured to move the end or the roller 304 closer to, and further from, the travel stop 312, which is accomplished by rotating the threaded connector 316. Specifically, in the shown example, the threaded connector 316 comprises a threaded portion of a bolt that is threaded into a threaded hole in a receiver 318 mounted to the end of the roller 304. The spring 314 is captured between the head 320 of the bolt and the tensioner mount 306. In this case, the end of the spring 314 that is in contact with the tensioner mount 306 acts as the travel stop 312. Rotating the bolt head 320, such as by using a manual tool (socket or wrench) or a power tool, changes the distance between the bolt head 320 and the receiver 318, thereby compressing the spring 314 to different degrees. The restoring force of the spring 314 moves the roller 304 in the lateral direction L, and generates a tension force in the belt 400.

FIG. 4A shows the tensioning system 300 in the fully-tensioned state. In this state, the spring 314 is preloaded to generate the desired tension force in the belt 400. When it is desired to remove or service the belt 400 or roller 304, the operator can rotate the bolt head 320 (and thus the threaded connector 316) to release tension from the spring 314. For example, FIG. 4B shows the threaded connector 316 being backed out of the receiver 318 a sufficient distance to reduce the tension in the spring 314 to zero, or to a relatively low level. When the spring tension is sufficiently reduced, the operator can move the belt tensioner 310 through an opening 322 through the tensioner mount 306, to remove the travel stop 312 from the tensioner mount 306, such as shown in FIG. 4C. In this position, the roller 304 is fully released from the tensioner mount 306 and is free to move laterally to allow belt service and replacement.

This configuration is expected to provide various advantages. For example, the travel stop 312, spring 314 and threaded connector 316 can be removed from the tensioner mount 306 without disassembling them from each other, and without detaching them from the roller 324. This allows an operator to detach the roller 304 for service without risking the loss of the belt tensioner components, and without having to reassemble the parts. Such benefits are particularly helpful in relation to certain existing products, in which a tensioning bolt must be completely removed to release the roller (requiring many turns of the bolt, even after spring tension is released), and reassembly requires the operator to insert bolts into blind nuts or the like. The advantages become greater when such service work is being performed in the field during the harvesting operation.

The direction in which the belt tensioner 310 moves to release the travel stop 312 from the tensioner mount 306 may have a bearing on other aspects of the mechanism design. For example, if the opening 322 is positioned to require the belt tensioner 310 to pivot in a direction that is not perpendicular to the roller rotation axis 308, it might be necessary to provide an articulated joint to allow such motion. In the example of FIGS. 4A-4C, the receiver 318 is formed as a spherical rod end fitting that is connected to the roller axle 402 by a bolt 404, to allow the displacement necessary to release the belt tensioner 310 from the tensioner mount 306. Other mechanisms (e.g., ball joints or elastomeric bushings) may be used in other embodiments. If the opening 322 is configured to allow the belt tensioner 310 to release by rotating the belt tensioner in a plane perpendicular to the roller rotation axis 305 (such as in FIGS. 12-13B), it may not be necessary to provide an articulated joint.

For illustration purposes, FIGS. 3-4C show only the portion of the tensioning system 300 located at one end of the roller 304. At the other end, the roller 304 may be mounted by a second tensioner mount and a second belt tensioner, which may be identical to or different from the system at the other end of the roller.

Figure 5:
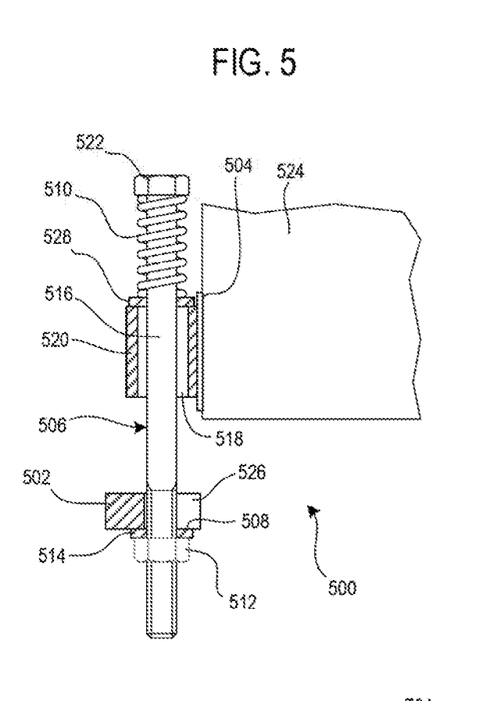
FIG. 5 shows another exemplary embodiment of a draper belt tensioning system.

FIG. 5 shows another example of a belt tensioning system 500. Here, the belt tensioning system 500 includes once again includes a tensioner mount 502 attached to the header frame, a roller 504, and a belt tensioner 506 that selectively connects the roller 504 to the tensioner mount 502. The belt tensioner 506 includes a travel stop 508, a spring 510, and a threaded connector 512.

As before, when the travel stop 508 is engaged with the tensioner mount 502, the tensioner mount 502 is located between the travel stop 508 and the roller 504. In this case, the threaded connector 512 is a threaded nut, and the travel stop 508 is a surface of a washer 514 located between the threaded connector 512 and the tensioner mount 502.

The threaded connector 512 is threaded onto the end of a bolt 516 that extends through a passage 518 through the end of the roller 504. The passage 518 may be formed, for example, through an end of an axle 520 upon which the roller 504 is mounted. The spring 510 is captured between the bolt head 522 and the axle 520.

In use, the spring 510 generates a resilient force acting between the bolt head 522 and the axle 520, to thereby generate tension in a belt 524 wrapped around the roller 504. The amount of tension can be adjusted by turning the threaded connector 512. When it is desired to release belt tension, the operator turns the threaded connector 512 to allow the bolt head 522 to move away from the tensioner mount 502, and such rotation eventually releases all tension from the spring 510. When the tension is eliminated or reduced to a low level, the operator can slide the threaded connector 512 and washer 514 through an opening 526 in the side of the tensioner mount 502, similar to the manner shown in FIG. 4C.

As before, it may be necessary to provide for some rotation of the bolt 516 relative to the roller 504 to allow the belt tensioner 506 to release from the tensioner mount 502. In this case, such motion may be provided by making the passage 518 large enough to allow angular displacement of the bolt 516. If the passage 518 is large enough to risk the spring 510 passing through it, a washer 528 may be provided to prevent this from happening.

Figure 6:
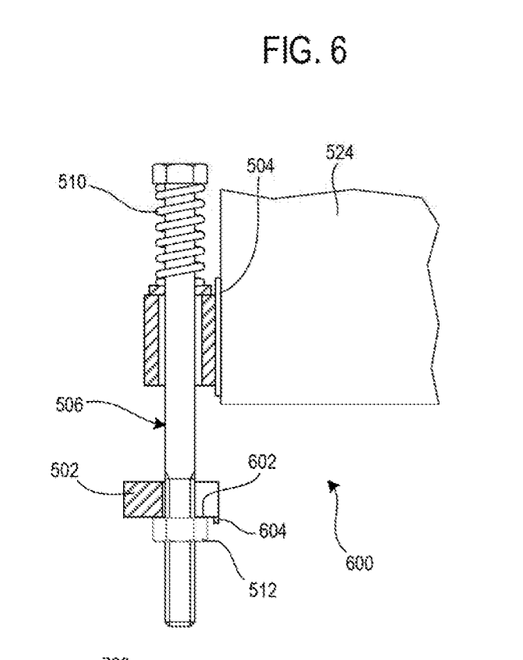
FIG. 6 shows another exemplary embodiment of a draper belt tensioning system.

FIG. 6 illustrates another exemplary belt tensioning system 600. In this case, the structure is the same as that of FIG. 5, with two differences. First, the washer 514 is omitted, and the travel stop 602 is formed by a face of the threaded connector 512. Second, a lip 604 is added at the end of the opening 526 to prevent the threaded connector 512 from moving out of the tensioner mount 502 without displacing the threaded connector 512 axially away from the tensioner mount 502. The lip 604 may be helpful to hold the belt tensioner 506 in place during assembly and disassembly at times when there is little or no tension present to generate friction force between the travel stop 602 and the tensioner mount 502. The lip 604 also might be useful to prevent the belt tensioner 506 from disengaging from the tensioner mount 502 during operation or if the tensioner mount 502 becomes deformed.

Figure 7:
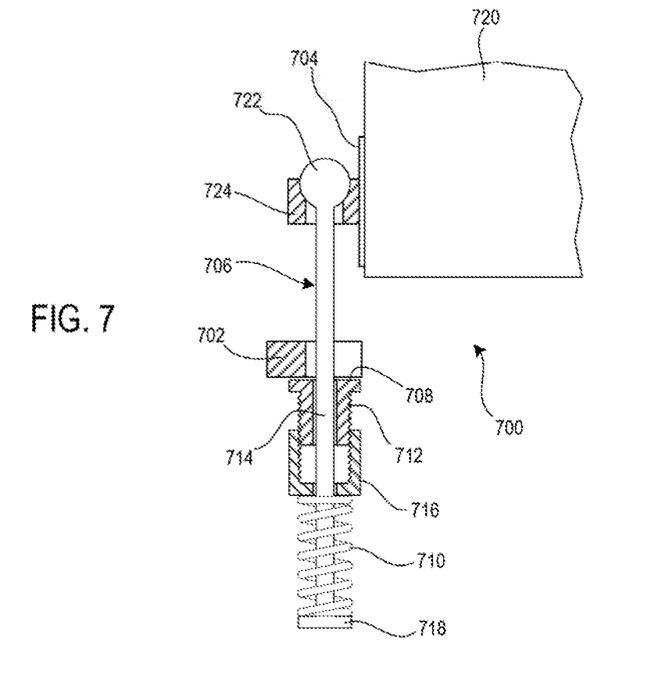
FIG. 7 shows another exemplary embodiment of a draper belt tensioning system.

FIG. 7 shows another example of a belt tensioning system 700. Here, the system 700 again includes a tensioner mount 702 attached to the header frame, a roller 704, and a belt tensioner 706 that selectively connects the roller 704 to the tensioner mount 702. The belt tensioner 706 includes a travel stop 708, a spring 710, and a threaded connector 712. Also as before, when the travel stop 708 is engaged with the tensioner mount 702, the tensioner mount 702 is located between the travel stop 708 and the roller 704.

In this case, the threaded connector 712 is provided as a threaded collar that surrounds the belt tensioner shaft 714. An adjustment nut 716 also surrounds the shaft 714, and has inner threads that match the outer threads of the threaded connector 712. Thus, rotation of the threaded connector 712 relative to the adjustment nut 716 causes the assembly to expand or contract. The threaded connector 712 is captured, along with the spring 710, between the tensioner mount 702 and an end stop 718 located at the end of the belt tensioner shaft 714. The spring 710, threaded connector 712 and adjustment nut 716 are dimensioned such that the threaded connector 712 and adjustment nut 716 may be rotated relative to one another to apply tension to the spring 710 to generate tension in the belt 720, and to release tension from the spring 710 to allow belt service. When the tension is removed or reduced to a low level, an operator can slide the belt tensioner 706 out of engagement with the tensioner mount 702 to allow the roller 704 to move freely without requiring disassembly of the belt tensioner 706. The threaded connector 712 may be located between the tensioner mount 702 and the spring 710, such as shown, in which case the travel stop 708 may comprise one face of the threaded connector 712 or adjustment nut 716. Alternatively, the spring 710 or a washer (not shown) may be located to abut the tensioner mount 702 to form the travel stop.

The belt tensioner 706 may be connected to the roller 704 using any suitable connection. In this example, the belt tensioner 706 has a spherical or hemispherical rod end 722 that fits into a corresponding hemispherical recess in the roller axle 724.

Referring now to FIGS. 3 and 8-10, the tensioner mount may have any suitable construction to provide a surface against which the belt tensioner operates to generate tension in the belt, while also allowing the belt tensioner to selectively release the tensioner mount.

In FIG. 3, the tensioner mount 306 is formed as a cylindrical tube having an opening 322 along one side. The end of the tube facing away from the roller is configured as an engagement surface that is sized to engage the travel stop to prevent the spring tensioner 310 from passing through the tube. The side opening 322 is sized to allow the shaft of the belt tensioner 310 to pass through.

Figure 8:
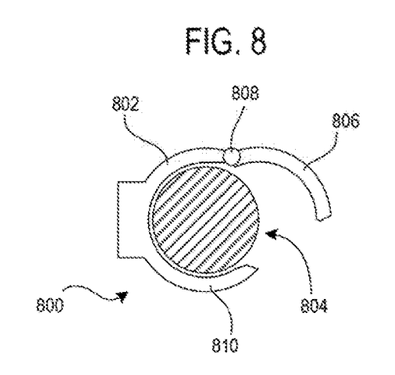
FIG. 8 shows an exemplary embodiment of a tensioner mount.

FIG. 8 shows a modification of the embodiment of FIG. 3. As before, the tensioner mount 800 comprises a cylindrical tube 802 having an opening 804 through one side, and an engagement surface 810 facing away from the roller. In this case, however, a cover 806 is provided to selectively close the opening 804. For example, the cover 806 may be formed as a tubular section that fits the opening 804, and is attached to the remainder of the tensioner mount 800 by a pivot 808. The cover 806 may or may not form a portion of the engagement surface 810.

Figure 9:
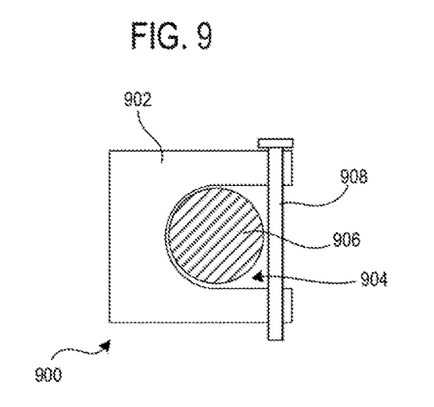
FIG. 9 shows another exemplary embodiment of a tensioner mount.

FIG. 9 shows another example of a tensioner mount 900. In this case, the tensioner mount 900 is formed as a plate 902 forming an engagement surface facing away from the roller. The plate 902 has a notch 904 extending through it. The notch 904 is open to one side to allow the belt tensioner shaft 906 to pass through by moving it in the lateral direction. The notch 904 may have a U-shape or any other suitable shape sized for receiving the belt tensioner shaft 906 while preventing the travel stop from passing through in the axial direction. If desired, a safety pin 908 may be provided to prevent inadvertent release of the belt tensioner shaft 906 from the notch 904.

Figure 10:
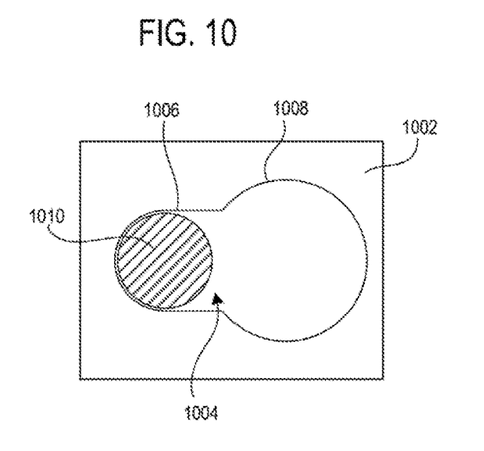
FIG. 10 shows another exemplary embodiment of a tensioner mount.

FIG. 10 shows yet another embodiment of a tensioner mount 1000. In this case, the tensioner mount 1000 comprises a plate 1002 forming an engagement surface facing away from the roller. The plate 1002 has an enclosed passage 1004 having a first portion 1006 and a second portion 1008 that are joined together to form a single continuous opening. The first portion 1006 is dimensioned to receive the belt tensioner shaft 1010 while preventing the travel stop from passing through. The second portion 1008 is dimensioned to allow the travel stop and the remaining portions of the belt tensioner to pass through. In use, an operator can release tension on the belt tensioner, and then slide it sideways to the second portion 1008 to allow it to move freely through the second portion 1008 of the opening 1004.

Figure 11:
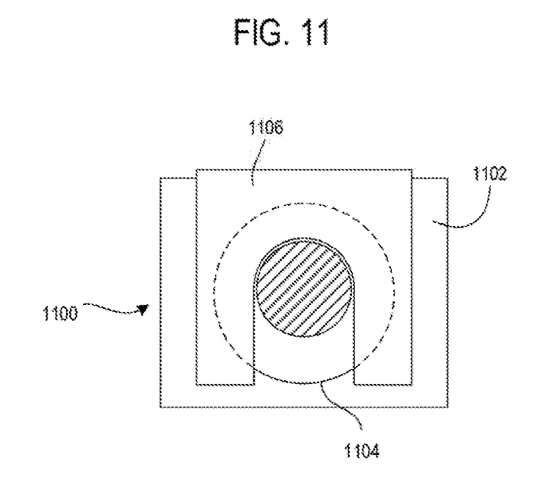
FIG. 11 shows another exemplary embodiment of a tensioner mount.

FIG. 11 shows another embodiment of a tensioner mount 1100. In this case, the tensioner mount again includes a plate 1102 having a single opening 1104 that is large enough to allow the travel stop of the belt tensioner to pass through. A notched aperture plate 1106 is provided to selectively overlap the plate 1102 and opening 1104, and is dimensioned to prevent the travel stop from passing through the opening 1104. Thus, the aperture plate 1106 cooperates with the plate 1102 to form an engagement surface facing away from the roller to hold the travel stop of the belt tensioner. To release the belt tensioner, the operator reduces or removes tension on the spring, slides the aperture plate 1106 out of the way, and then passes the travel stop and remaining portions of the belt tensioner through the opening 1104.

Figure 12:
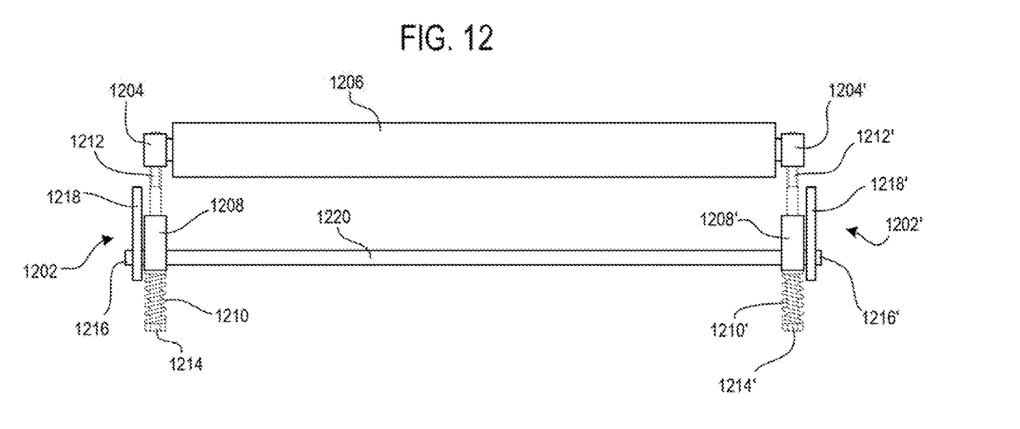
FIG. 12 shows another exemplary embodiment of a draper belt tensioning system.
Figure 13A:
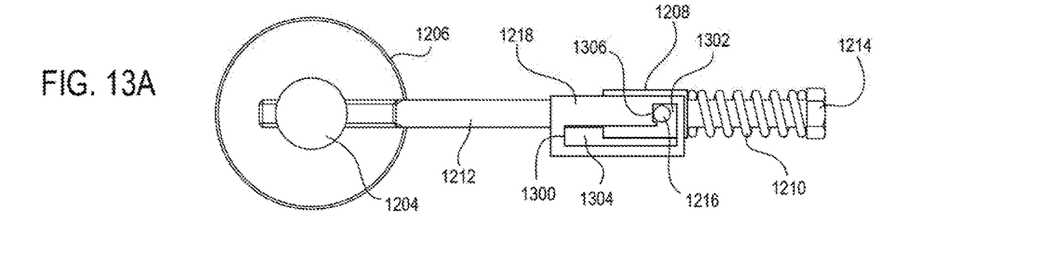
FIGS. 13A-13B show the draper belt tensioning system of FIG. 12 in the tensioned and released positions, respectively.
Figure 13B:
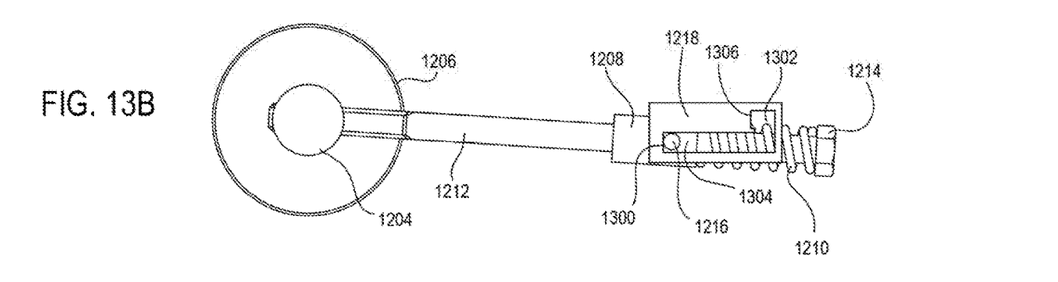

FIGS. 12 and 13A-B illustrate another exemplary embodiment of a belt tensioner system 1200. In this case, the belt tensioner system 1200 includes a first belt tensioner 1202 connected to a first end 1204 of a roller 1206, and a second belt tensioner 1202' connected to a second end 1204' of the roller 1206. Each belt tensioner 1202, 1202' comprises a travel stop 1208, 1208', a spring 1210, 1210', and a threaded connector 1212, 1212'.

In this case, the threaded connectors 1212, 1212' are bolts that extend from bolt heads 1214, 1214' to threaded ends that are threaded into corresponding holes at the respective ends 1204, 1204' of the roller 1206. The travel stops 1208, 1208' are formed as collars that surround the threaded connectors 1212, 1212', and the springs 1210, 1210' are captured between the travel stops 1208, 1208' and the bolt heads 1214, 1214'.

Each travel stop 1208, 1208' also includes a pin 1216, 1216' that engages a corresponding track 1300 in a respective tensioner mount 1218, 1218'. The tensioner mounts 1218, 1218' are mounted to the header frame and provide surfaces against which the pins 1216, 1216' can apply pressure to tension the belt. As shown in FIGS. 13A-13B, the tracks 1300 each have a first portion 1302 and a second portion 1304. Each first portion 1302 has an engagement surface 1306 facing away from the roller 1206. The engagement surface 1306 is configured to receive a respective pin 1216, 1216' to hold the pin 1216, 1216', and thus the travel stop 1208, 1208', at a first distance from the roller 1206. The second portion 1304 of the track is adjacent the first portion 1302, and comprises a slot that extends towards the roller 1206.

In use, the threaded connectors 1212, 1212' are rotated to compress or decompress the springs 1210, 1210' to generate or release tension on the roller 1206. When the tension is sufficiently low or entirely removed, the operator can move the belt tensioners 1202, 1202' to remove the pins 1216, 1216' from the respective engagement surfaces 1306, whereupon the pins 1216, 1216' and the travel stops 1208, 1208' may slide along the slots 1304 to release the roller 1206 for service. To facilitate simple operation of the mechanism, the first travel stop 1208 may be connected to the second travel stop 1208' by a crossbar 1220.

Figure 14:
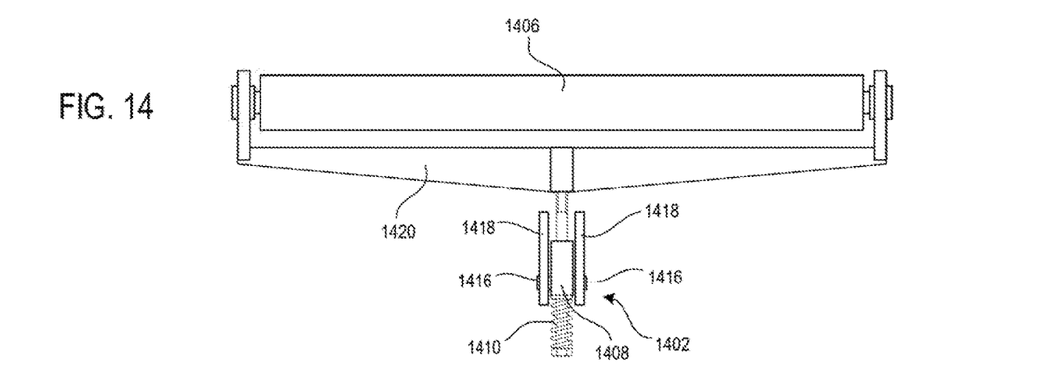
FIG. 14 shows another exemplary embodiment of a draper belt tensioning system.

Another exemplary embodiment of a draper belt tensioning system 1400 is shown in FIG. 14. In this case, a single belt tensioner 1402 is joined to both ends of a roller 1406 by a rigid crossbar 1420. The belt tensioner 1402 may comprise any type of belt tensioner such as previously described herein. In this example, the belt tensioner is constructed like the belt tensioners 1202, 1202' in FIGS. 12-13B, and includes a spring 1410 and a travel stop 1408. The travel stop 1408 is mounted in a tensioner 1418, via laterally-extending pins 1416 that fit into a corresponding slot in each tensioner 1408. The tensioner 1418 is attached to the frame of the header. Operation is the same as in FIGS. 13A-13B.

The foregoing embodiments may provide various advantages, but it is expected that all or most embodiments will be helpful to alleviate some difficulties with operating existing belt tensioning systems. In particular, where a typical belt tensioning system requires the operator to completely remove tensioner bolts holding the roller, the foregoing embodiments allow the roller to be de-tensioned for service without disassembling the belt tensioners. In use, the operator adjusts one or both belt tensioners by rotating the threaded connector to move the end of the roller some distance away from the tensioner mount, and moving the belt tensioner out of engagement with the tensioner mount. With the belt tensioner disengaged from the tensioner mount, the operator can move the roller further from the tensioner mount without resistance from the belt tensioner, to allow relatively fast and simple service.

Embodiments such as described herein may be used in any suitable combination or configuration in machinery having draper belts or similar conveyors. However, it is expected that embodiments will have particular utility in agricultural combines such as described in relation to FIGS. 1 and 2, to improve the serviceability of such equipment both in the shop and in the field.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A draper belt tensioning system comprising:
   a frame;
   a roller extending along a roller rotation axis from a first roller end to a second roller end, the roller being movable relative to the frame along a lateral direction that is perpendicular to the roller rotation axis;
   a first tensioner mount attached to the frame at a location spaced from the first roller end along the lateral direction, the first tensioner mount comprising a first engagement surface facing away from the first roller end and a first tensioner mount passage extending along the lateral direction from the first engagement surface towards the first roller end, wherein the first tensioner mount passage has an open side in a direction perpendicular to the lateral direction; and a first belt tensioner connected to the first roller end and selectively connectable to the first tensioner mount, the first belt tensioner comprising:
  a first shaft movably attached to the first roller end, and movable between an engaged position in which the first shaft is located in the first tensioner mount passage, and a disengaged position in which the first shaft is not located in the first tensioner mount passage,
  a first travel stop positioned on the first shaft at a location spaced from the first roller end, wherein the first travel stop is positioned along the first shaft to contact the first engagement surface when the first shaft is in the engaged position with the first tensioner mount between the first travel stop and the first roller end, and to not contact the first engagement surface when the first shaft is in the disengaged position,
  a first spring attached to the first shaft at a first location, wherein, when the first shaft is in the engaged position, the first tensioner mount is between the first spring and the first roller end, or the first roller end is between the first spring end and the first tensioner mount, such that the first spring applies a first biasing force to move the first roller end towards the first tensioner mount, and
  a first threaded connector positioned along the first shaft and configured to move the first roller end closer to and further from the first travel stop upon rotation of the first threaded connector,
  wherein the first shaft is movable between the engaged position and the disengaged position with the first travel stop, first spring, first threaded connector and first roller end connected to the first shaft.

2. The draper belt tensioning system of claim 1, wherein the first belt tensioner comprises a threaded hole connected to the first roller end, and the first threaded connector comprises a threaded portion of the first shaft that is rotationally engaged with the threaded hole.

3. The draper belt tensioning system of claim 1, wherein the first threaded connector comprises a threaded nut rotationally engaged with a threaded portion of the first shaft.

4. The draper belt tensioning system of claim 1, wherein:
  the shaft comprises a distal end stop; and
  the first threaded connector comprises a threaded collar surrounding the shaft and having outer threads, and an adjustment nut surrounding the shaft and the threaded collar and having and inner threads engaged with the outer threads; and
  the threaded collar, the adjustment nut and the spring are located between the first tensioner mount and the distal end stop.

5. The draper belt tensioning system of claim 1, wherein the first travel stop comprises a face of a threaded nut.

6. The draper belt tensioning system of claim 1, wherein the first travel stop comprises a face of the first spring.

7. The draper belt tensioning system of claim 1, wherein the first travel stop comprises a face of a washer.

8. The draper belt tensioning system of claim 4, wherein the first travel stop comprises a face of the adjustment nut or the first threaded connector.

9. The draper belt tensioning system of claim 1, further comprising a cover movably attached to the first tensioner mount, and movable to a position in which the cover is positioned over the open side of the passage.

10. The draper belt tensioning system of claim 1, wherein the first engagement surface comprises an aperture plate selectively positionable at an end of the passage.

11. The draper belt tensioning system of claim 1, wherein the first tensioner mount comprises a second shaft connected to the second roller end.

12. The draper belt tensioning system of claim 1, wherein:
  the frame further comprises a second tensioner mount attached to the frame at a location spaced from the second roller end along the lateral direction, the second tensioner mount comprising a second engagement surface facing away from the second roller end and a second tensioner mount passage extending along the lateral direction from the first engagement surface towards the first roller end, wherein the first tensioner mount passage has an open side in a direction perpendicular to the lateral direction and;
  the draper belt tensioning system further comprises a second belt tensioner connected to the second roller end and selectively connectable to the second tensioner mount, wherein the second belt tensioner comprises:
    a second shaft movably attached to the second roller end, and movable between a respective engaged position in which the second shaft is located in the second tensioner mount passage, and a respective disengaged position in which the second shaft is not located in the second tensioner mount passage,
    a second travel stop positioned on the second shaft at a location spaced from the second roller end, wherein the second travel stop is positioned along the second shaft to contact the second engagement surface when the second shaft is in the engaged position with the second tensioner mount between the second travel stop and the second roller end, and to not contact the second engagement surface when the second shaft is in the disengaged position,
    a second spring attached to the second shaft at a second location, wherein, when the second shaft is in the engaged position, the second tensioner mount is between the second spring and the second roller end, or the second roller end is between the second spring end and the second tensioner mount, such that the second spring applies a second biasing force to move the second roller end towards the second tensioner mount, and
    a second threaded connector positioned along the second shaft and configured to move the second roller end closer to and further from the second travel stop upon rotation of the second threaded connector,
    wherein the second shaft is movable between the engaged position and the disengaged position with the second travel stop, second spring, second threaded connector and second roller end connected to the second shaft.

13. The draper belt tensioning system of claim 12, wherein the first travel stop is connected to the second travel stop by a crossbar.

14. A method for disconnecting a draper belt tensioning system, the method comprising:
  adjusting a first belt tensioner by rotating a first threaded connector to move a first end of a roller a first distance away from a first tensioner mount;
  moving the first belt tensioner to a position in which the first belt tensioner is not in contact with the first tensioner mount; and moving the first end of the roller a second distance away from the first tensioner mount, the second distance being greater than the first distance, without disassembling the first belt tensioner or removing the first belt tensioner from the first end of the roller.

15. The method of claim 14, further comprising:
adjusting a second belt tensioner by rotating a second threaded connector to move a second end of the roller a respective first distance away from a second tensioner mount;
moving the second belt tensioner to a position in which the second belt tensioner is not in contact with the second tensioner mount; and
moving the second end of the roller a respective second distance away from the second tensioner mount, the respective second distance being greater than the respective first distance, without disassembling the second belt tensioner or removing the second belt tensioner from the second end of the roller.

16. An agricultural combine comprising:
a chassis configured for movement across a surface;
a threshing and separating system mounted on the chassis; and
a header attached to the chassis and operatively connected to the threshing and separating system by a feeder housing, the header including:
a frame;
a roller extending along a roller rotation axis from a first roller end to a second roller end, the roller being movable relative to the frame along a lateral direction that is perpendicular to the roller rotation axis;
a first tensioner mount attached to the frame at a location spaced from the first roller end along the lateral direction, the first tensioner mount comprising a first engagement surface facing away from the first roller end and a first tensioner mount passage extending along the lateral direction from the first engagement surface towards the first roller end, wherein the first tensioner mount passage has an open side in a direction perpendicular to the lateral direction; and
a first belt tensioner connected to the first roller end and selectively connectable to the first tensioner mount, the first belt tensioner comprising:
a first shaft movably attached to the first roller end, and movable between an engaged position in which the first shaft is located in the first tensioner mount passage, and a disengaged position in which the first shaft is not located in the first tensioner mount passage,
a first travel stop positioned on the first shaft at a location spaced from the first roller end, wherein the first travel stop is positioned along the first shaft to contact the first engagement surface when the first shaft is in the engaged position with the first tensioner mount between the first travel stop and the first roller end, and to not contact the first engagement surface when the first shaft is in the disengaged position,
a first spring attached to the first shaft at a first location, wherein, when the first shaft is in the engaged position, the first tensioner mount is between the first spring and the first roller end, or the first roller end is between the first spring end and the first tensioner mount, such that the first spring applies a first biasing force to move the first roller end towards the first tensioner mount, and
a first threaded connector positioned along the first shaft and configured to move the first roller end closer to and further from the first travel stop upon rotation of the first threaded connector,
wherein the first shaft is movable between the engaged position and the disengaged position with the first travel stop, first spring, first threaded connector and first roller end connected to the first shaft.

17. The agricultural combine of claim 16, wherein the header further comprises a second tensioner mount, and a second belt tensioner, the second belt tensioner being connected to the second roller end and selectively connectable to the second tensioner mount.

* * * * *